(12) United States Patent
Graham et al.

(10) Patent No.: US 6,985,970 B2
(45) Date of Patent: Jan. 10, 2006

(54) DATA TRANSFER WITH IMPLICIT NOTIFICATION

(75) Inventors: Charles S. Graham, Rochester, MN (US); Brent W. Jacobs, Rochester, MN (US); Daniel F. Moertl, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 10/424,189

(22) Filed: Apr. 25, 2003

(65) Prior Publication Data

US 2004/0215849 A1   Oct. 28, 2004

(51) Int. Cl.
  *G06F 13/14* (2006.01)

(52) U.S. Cl. ............... 710/5; 710/19; 710/56

(58) Field of Classification Search ............... 710/5–7, 710/15, 19, 22–28, 39, 40
  See application file for complete search history.

(56) References Cited

U.S. PATENT DOCUMENTS

| 5,448,702 A | * | 9/1995 | Garcia et al. ............... 710/100 |
| 5,828,901 A | * | 10/1998 | O'Toole et al. ............... 710/22 |
| 6,049,842 A | * | 4/2000 | Garrett et al. ............... 710/33 |
| 2003/0227933 A1 | * | 12/2003 | Eberle et al. ............... 370/419 |

* cited by examiner

*Primary Examiner*—Ilwoo Park
(74) *Attorney, Agent, or Firm*—Owen J. Gamon (57) ABSTRACT

A method, apparatus, system, and signal-bearing medium are provided that in an embodiment receive a command at an adapter from an initiator that requests a transfer of data, transfer the data from the initiator to the adapter, and respond with a notification to the initiator that the command completed successfully after transferring the data to the adapter and prior to the adapter completing a process based on the command.

23 Claims, 7 Drawing Sheets

DATA TRANSFER WITH IMPLICIT NOTIFICATION

FIELD

This invention relates generally to transferring data, and more particularly to efficiently controlling the transfer of data to an adapter.

BACKGROUND

A computer system stores data in its memory. In order to do useful work, the computer system operates on and performs manipulations against this data. Ideally, a computer system would have a singular, indefinitely large and very fast memory, in which any particular data would be immediately available to the computer system. In practice this has not been possible because memory that is very fast is also very expensive.

Thus, computers typically have a hierarchy (or levels) of memory, each level of which has greater capacity than the preceding level but which is also slower with a less expensive per-unit cost. These levels of the hierarchy may form a subset of one another, that is, all data in one level may also be found in the level below, and all data in that lower level may be found in the one below it, and so on until we reach the bottom of the hierarchy. In order to minimize the performance penalty that the hierarchical memory structure introduces, it is desirable to store the most-frequently-used data in the fastest memory and the least-frequently-used data in the slowest memory.

For example, a computer system might contain:

1) a very small, very fast, and very expensive cache that contains the most-frequently-used data;

2) a small, fast, and moderately expensive RAM (Random Access Memory) that contains all the data in the cache plus the next most-frequently-used data; and 3) several large, slow, inexpensive disk drives that contain all the data in the computer system.

When the computer system needs a piece of data, it looks first in the cache. If the data is not in the cache, the computer system retrieves the data from a lower level of memory, such as RAM or a disk drive, and places the data in the cache. If the cache is already full of data, the computer system must determine which data to remove from the cache in order to make room for the data currently needed. For efficiency, data may be moved between levels of storage in units called pages. The process of moving data between levels is called paging.

The algorithm used to select which page is moved back through the levels is called the replacement algorithm. Often, a "least-recently-used" algorithm is used to govern movement of pages. That is, pages that have not recently been referenced are replaced first. Thus, if a page is not used for an extended period of time, it will migrate through the storage hierarchy to the slowest level. Hence, the most-recently-used data is contained in high-speed, main storage ready for immediate access, while less-frequently-used data migrates though the storage hierarchy toward the slower-speed storage, often called secondary storage.

The least-recently-used algorithm is acceptable for many paging situations. Situations arise, however, in which certain data on certain pages must be available for immediate access in main storage independent of the usage history of the pages. Access to these pages may be required as a result of a reference made by either the processor or by an I/O (Input/Output) device or a network. For example, data buffers for certain high speed I/O devices or networks must be located in main storage.

A technique for insuring the presence of a page in main storage is called pinning. When a page is pinned, an area in main storage is reserved for the page, and the page is not permitted to migrate to secondary storage. Any attempt to replace a page pinned in this reserved storage is blocked. Pinning memory is expensive because it leaves less memory available for other system operations, which results in decreased performance because of increasing paging activity. Thus, it is desirable to only pin pages for the shortest duration possible so as not to decrease performance and to reduce the amount of system memory needed to transfer data to/from the I/O device or network.

Yet, current systems must keep pages pinned for an extended period of time, as can be seen in the following example of a sequence of actions that a typical system might take to perform a data transmission:

a. The system pins memory locations that contain data to be transferred.

b. The system builds and sends a command to an adapter that requests data to be transferred.

c. The adapter fetches the data and places it into a buffer in the adapter.

d. The adapter transmits the data across a network.

e. The adapter waits for and receives an acknowledgement across the network.

f. The adapter sends a response to the system indicating the command completed.

g. The system releases the pinned memory.

In order to increase performance and decrease the amount of memory needed to transfer data, what is needed is a way to decrease the amount of time that pages remain pinned. Although the aforementioned performance problems have been described in the context of a system pinning memory locations, they can apply in any scenario where performance is an issue.

SUMMARY

A method is provided that in an embodiment receives a command at an adapter from an initiator that requests a transfer of data, transfers the data from the initiator to the adapter, and responds with a notification to the initiator that the command completed successfully after transferring the data to the adapter and prior to the adapter completing a process based on the command.

In another embodiment, an apparatus is provided that comprises means for receiving at an adapter a plurality of commands on a plurality of connections from an initiator, wherein the plurality of commands requests transfer of respective data, and wherein the plurality of commands have an order of receipt, means for transferring at least some of the data out-of-order from the initiator to the adapter, and means for reporting an implicit notification to the initiator that the command completed successfully after transferring the data to the adapter and before completing a process based on the command.

In another embodiment, a signal-bearing medium is provided that is encoded with instructions, wherein the instructions when executed comprise receiving a command from an initiator that requests a transfer of data, transferring the data from the initiator to an adapter, determining whether to perform the transferring out-of-order with an order of a plurality of commands received from the initiator, and reporting an implicit notification to the initiator that the command completed successfully after transferring the data to the adapter and prior to the adapter completing a process based on the command.

In another embodiment, an input/output adapter is provided that comprises a data fetch engine to transfer data from an initiator to the input/output adapter; and a command fetch engine to: receive a command from the initiator that requests transfer of the data, determine whether the command requests an immediate transfer or a non-immediate transfer, when the command requests an immediate transfer, report to the initiator an implicit notification that the command completed after the transfer of the data from the initiator to the input/output adapter but prior to the adapter completing a process based on the command, and when the command requests a non-immediate transfer, report to the initiator the implicit notification that the command completed before the transfer of the data from the initiator to the input/output adapter.

In another embodiment, a system is provided comprising an initiator to pin at least one page, send a command that requests transfer of data, and unpin the at least one page after receipt of an implicit notification that the command completed, and an adapter to receive the command and report the implicit notification after transfer of the data from the initiator to the adapter but prior to the adapter completing a process based on the command.

In this way, in various embodiments the performance of a data transfer may be increased, and the amount of memory needed to do the data transfer may be decreased.

DETAILED DESCRIPTION

Figure 1:
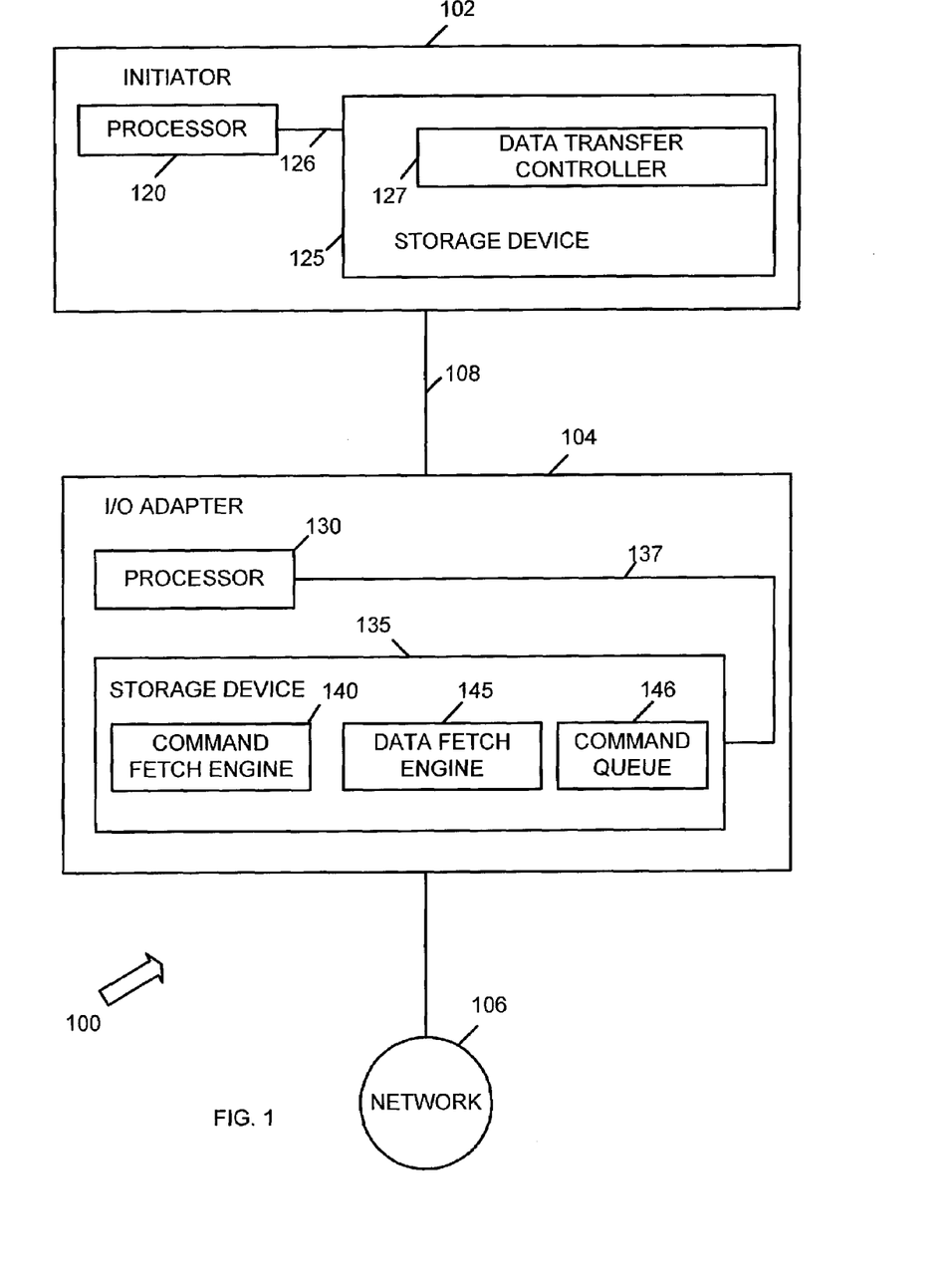
FIG. 1 depicts a block diagram of an example system for implementing an embodiment of the invention.

FIG. 1 depicts a block diagram of an example system 100 for implementing an embodiment of the invention. The system 100 includes an initiator 102 connected to an I/O (Input/Output) adapter 104 via a bus 108. The I/O adapter 104 is further connected to a network 106. Although only one initiator 102, one I/O adapter 104, and one network 106 are shown, in other embodiments any number or combination of them may be present.

The initiator 102 includes a processor 120 and a storage device 125 connected via a bus 126. The processor 120 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 120 executes instructions and includes that portion of the initiator 102 that controls the operation of the entire initiator. Although not depicted in FIG. 1, the processor 120 typically includes a control unit that organizes data and program storage in memory and transfers data and other information between the various parts of the initiator 102. The processor 120 reads and/or stores code and data to/from the storage device 125 and/or the I/O adapter 104.

Although the initiator 102 is shown to contain only a single processor 120 and a single bus 126, the present invention applies equally to initiators that may have multiple processors and multiple buses with some or all performing different functions in different ways.

The storage device 125 represents one or more mechanisms for storing data. For example, the storage device 125 may include read only memory (ROM), random access memory (RAM), magnetic disk storage media, optical storage media, flash memory devices, and/or other machine-readable media. In other embodiments, any appropriate type of storage device may be used. Although only one storage device 125 is shown, multiple storage devices and multiple types of storage devices may be present. Further, although the initiator 102 is drawn to contain the storage device 125, it may be distributed across other initiators. The storage device 125 includes a data transfer controller 127, which sends data transfer commands to the I/O adapter 104 and may request that pages of data in the storage device 125 be pinned and unpinned.

The bus 126 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The initiator 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the initiator 102.

The I/O adapter 104 includes a processor 130 and a storage device 135 connected via a bus 137. The processor 130, the storage device 135, and the bus 137 may be analogous to the processor 120, the storage device 125, and the bus 126 previously described above. In another embodiment, the processor 130 is not present. Although the I/O adapter 104 is shown to be separately packaged from the initiator 102, in another embodiment they are packaged together. For example, in an embodiment, the I/O adapter 104 may be a card within the initiator 102.

The storage device 135 includes a command fetch engine 140, a data fetch engine 145, and a command queue 146. In an embodiment, the command fetch engine 140 and the data fetch engine 145 include instructions capable of being executed on the processor 130 to carry out the functions of the present invention, as further described below with reference to FIGS. 2–7. In another embodiment, some or all of the functions of the command fetch engine 140 and/or the data fetch engine 145 are carried out via hardware in lieu of or in addition to a processor-based system.

The command queue 146 is used to store addresses or locations of command blocks to be received from the initiator 102. The command queue 146 may include a command-queue head and a command-queue tail. The command-queue head is the location in the command queue 146 where the initiator 102 writes the address of the next command block. The command-queue tail is the location in the command queue 146 that specifies the address in the initiator 102 from which the command fetch engine 140 will fetch the next command block. The command queue 146 is further described below with reference to FIG. 2.

The command fetch engine 140 fetches commands from the initiator 102. The initiator 102 uses the wrapping head/tail command queue 146 to communicate the location of the commands from the initiator 102 to the I/O adapter 104. In an embodiment, the initiator 102 throttles as needed to assure that the command queue 146 is not overrun, which would result in lost commands. The initiator 102 writes the location (address) of the command block to the command queue head and then bumps the command queue head pointer. When the command fetch engine 140 sees that the head and tail pointers are different, the command fetch engine 140 fetches the command block pointed to by the command queue tail pointer. If the command block indicates that this command requires an immediate data fetch, the command fetch engine 140 sets the immediate data fetch needed and immediate data fetch connection variables and waits for the data fetch engine 145 to clear the immediate data fetch needed variable. The command fetch engine 140 then bumps the command queue tail pointer. This serves as an indication to the initiator 102 that the command has been fetched, and also serves as an implicit notification of command completion for a command that used an immediate data fetch. The initiator 102 learns of the change in the value of the command queue tail pointer in various embodiments by polling or by the I/O adapter 104 raising an interrupt whenever the command queue tail pointer value is changed. The command fetch engine 140 is further described below with reference to FIG. 2.

The data fetch engine 145 fetches the data from the initiator 102, so that the data may be transmitted to the network 106. In an embodiment, transferring data to the network 106 is an example of a process based on a command. The data fetch engine 145 uses per-connection parameters to provide for deadlock avoidance, starvation avoidance, resource prioritization, and fairness. In various embodiments, some or all of the parameters are tunable to provide for varying characteristics to meet the needs of a given application, and to allow a single design to fulfill many needs simply by tuning the parameters. The data fetch engine 145 goes round-robin among all the connections looking for a command block that has data that needs to be fetched. In an embodiment, a connection is a queue pair connection in an InfiniBand adapter. In another embodiment, a connection is a logical connection between two endpoints, such as devices.

When the data fetch engine 145 finds such a command block, the data fetch engine 145 examines the per-connection parameters to determine if the data transfer will exceed any limits. These limits include the maximum amount of data pages allocated and the number of data pages transferred already this round. If the transfer is acceptable, the data fetch engine 145 allocates enough data pages to hold the request (blocking the data transfer if needed until sufficient pages are made available by completing requests), and performs the transfer. If the transfer is unacceptable, the data fetch engine 145 moves on to the next connection. The request that was deemed unacceptable is served when the limits improve, for example on a subsequent round or when some of the data pages that the connection holds are freed because these commands have completed.

After every completed data fetch request, or upon finding there are no requests that can be currently satisfied, the data fetch engine 145 then checks to see if there is a request that requires an immediate data fetch. The data fetch engine 145 checks so frequently because the command fetch engine 140 is blocked until the immediate data fetch is completed. If there is a pending immediate data fetch request, the data fetch engine 145 performs a sequence of checks to determine the correct action to take. Those checks are described in detail below with reference to FIGS. 4 and 5.

Depending on the outcome of the checks, the data fetch engine 145 either performs the transfer immediately, performs a different transfer for the same connection (which eliminates some deadlock scenarios), or does neither and resumes normal processing. Because a given connection can have command blocks requesting both an immediate data fetch and a normal data fetch, it is possible for the data fetch engine 145 to perform requests for a given connection out-of-order to limit the amount of the time the command fetch engine is blocked. Because, in an embodiment, requests across the network 106 must execute in order, allocating resources (data pages in this case) out-of-order introduces the potential for deadlock. To prevent this deadlock, and also to avoid the performance degradation that would result if data for all requests were fetched in order, the per-connection parameters are used to maximally perform as many out-of-order data transfers between the initiator 102 and the I/O adapter 104 as possible. The data fetch engine 145 is further described below with reference to FIGS. 3–7.

The network 106 may be any suitable network or combination of networks and may support any appropriate protocol suitable for communication to the I/O adapter 104. In various embodiments, the network 106 may represent a storage device or a combination of storage devices, either connected directly or indirectly to the I/O adapter 104. In an embodiment, the network 106 may support Infiniband. In an embodiment, the network 106 may support wireless communications. In another embodiment, the network 106 may support hard-wired communications, such as a telephone line or cable. In another embodiment, the network 106 may support the Ethernet IEEE (Institute of Electrical and Electronics Engineers) 802.3x specification. In another embodiment, the network 106 may be the Internet and may support IP (Internet Protocol). In another embodiment, the network 106 may be a local area network (LAN) or a wide area network (WAN). In another embodiment, the network 106 may be a hotspot service provider network. In another embodiment, the network 106 may be an intranet. In another embodiment, the network 106 may be a GPRS (General Packet Radio Service) network. In another embodiment, the network 106 may be any appropriate cellular data network or cell-based radio network technology. In another embodiment, the network 106 may be an IEEE 802.11B wireless network. In still another embodiment, the network 106 may be any suitable network or combination of networks. Although one network 106 is shown, in other embodiments any number of networks (of the same or different types) may be present.

The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

As will be described in detail below, aspects of an embodiment of the invention pertain to specific apparatus and method elements implementable on a computer, adapter, or other initiator. In another embodiment, the invention may be implemented as a program product for use with an adapter or other initiator. The programs defining the functions of this embodiment may be delivered to the adapter or initiator via a variety of signal-bearing media, which include, but are not limited to:

(1) information permanently stored on a non-rewriteable storage medium, e.g., a read-only memory device attached to or within an adapter or initiator, such as a CD-ROM readable by a CD-ROM drive;

(2) alterable information stored on a rewriteable storage medium, e.g., a hard disk drive or diskette; or (3) information conveyed to an adapter or initiator by a communications medium, such as through a computer or a telephone network, including wireless communications.

Such signal-bearing media, when carrying machine-readable instructions that direct the functions of the present invention, represent embodiments of the present invention.

Figure 2:
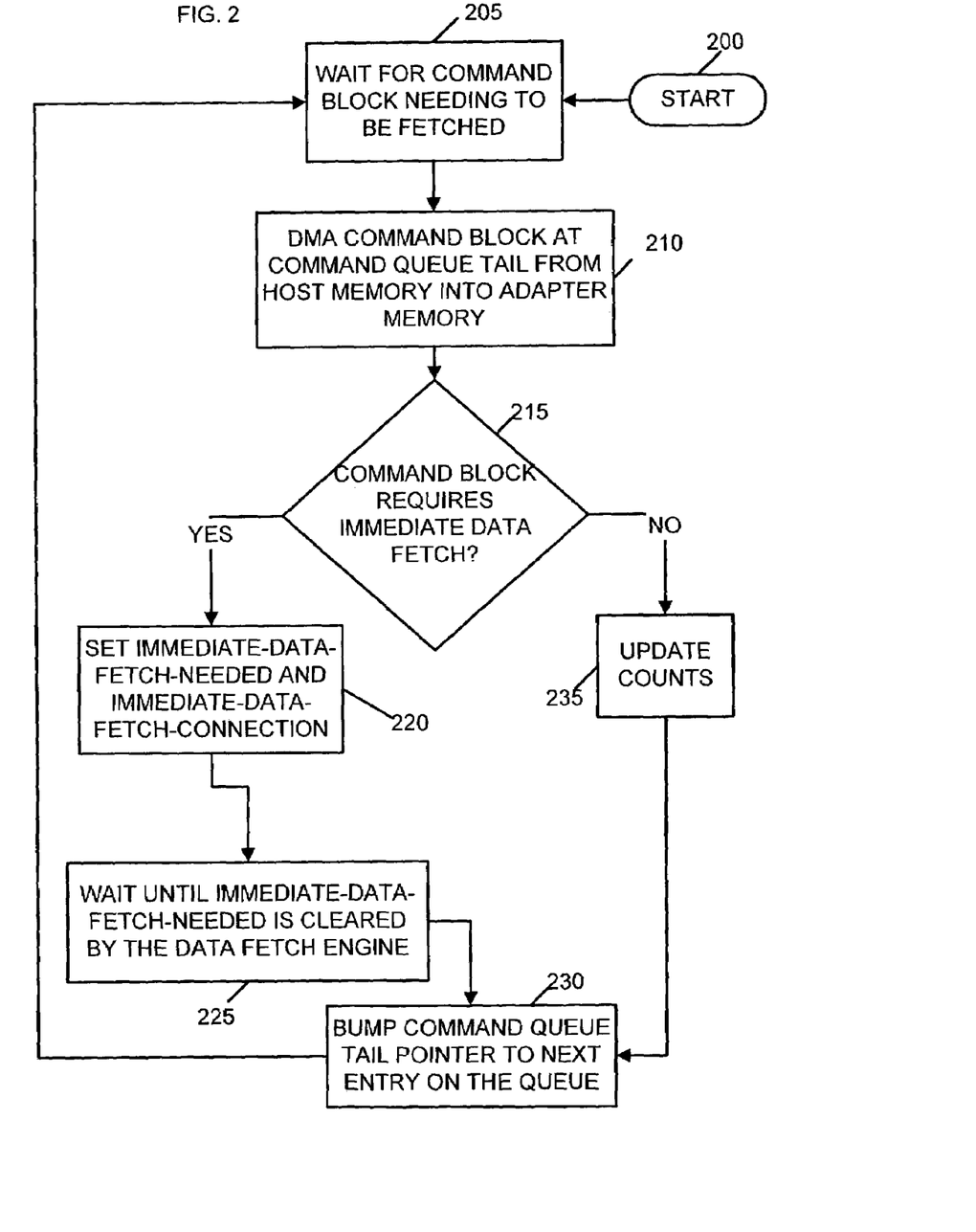
FIG. 2 depicts a flowchart of example processing for a command fetch engine, according to an embodiment of the invention.

FIG. 2 depicts a flowchart of example processing for the command fetch engine 140, according to an embodiment of the invention. Control begins at block 200. Control then continues to block 205 where the command fetch engine 140 waits for notification that a command block needs to be fetched from the initiator 102. In an embodiment, the initiator 102 writes an address of the command block to a head of the command queue 146 and bumps a command-queue head pointer. The command fetch engine 140 receives the notification by determining that the command-queue head and tail pointers are different.

Control then continues to block 210 where the command fetch engine 140 performs a DMA (Direct Memory Access) operation to retrieve the command block identified at the command-queue tail from the storage device 125 in the initiator 102 to the storage device 135 in the I/O adapter 104. Control then continues to block 215 where the command fetch engine 140 determines whether the command block requires an immediate data fetch.

If the determination at block 215 is true, then control continues to block 220 where the command fetch engine 140 sets the immediate data fetch needed and the immediate data fetch connection variables. The immediate data fetch needed may be a boolean indication (true/false) of whether or not the command fetch engine 140 is paused waiting for the data fetch engine 145 to fetch data for the last command block retrieved. The immediate data fetch needed variable is set by the command fetch engine 140 and cleared by the data fetch engine 145. The immediate data fetch connection variable indicates which connection requires the immediate data fetch. The immediate data fetch connection variable is only valid when the immediate data fetch variable is set to true.

Control then continues to block 225 where the command fetch engine 140 waits for the data fetch engine 145 to clear the immediate data fetch needed variable, as further described below with reference to FIG. 5. Control then continues to block 230 where the command fetch engine 140 bumps the command-queue tail pointer to the next entry on the command queue 146. Control then returns to block 205 as previously described above.

If the determination at block 215 is false, then control continues to block 235 where the command fetch engine 140 increases the total data not allocated variable by the operation size. The total data not allocated is a variable that indicates the number of pages not already allocated that are required by the current connection to complete all commands that have already been fetched. The operation size is the number of data pages requested to be transferred by the current command block. Control then continues to block 230 as previously described above.

Figure 3:
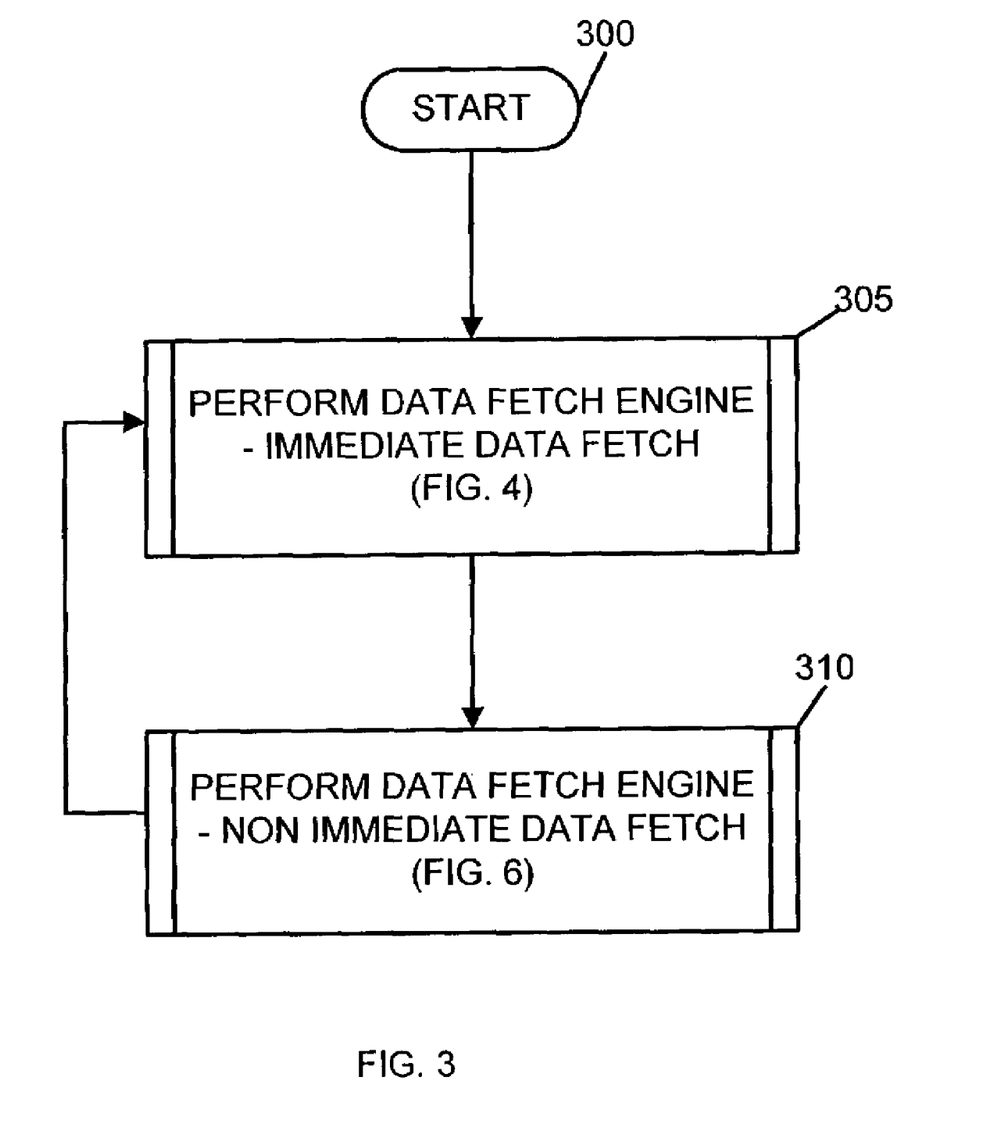
FIG. 3 depicts a flowchart of example processing for a data fetch engine, according to an embodiment of the invention.

FIG. 3 depicts a flowchart of example processing for the data fetch engine 145, according to an embodiment of the invention. In various embodiments the processing of the data fetch engine 145 is invoked at power on or at another selected time. Control begins at block 300. Control then continues to block 305 where the data fetch engine 145 performs an immediate data fetch operation as further described below with reference to FIG. 4. Control then continues to block 310 where the data fetch engine 145 performs a non-immediate data fetch operation as further described below with reference to FIG. 6. Control then returns to block 305, as previously described above.

Figure 4:
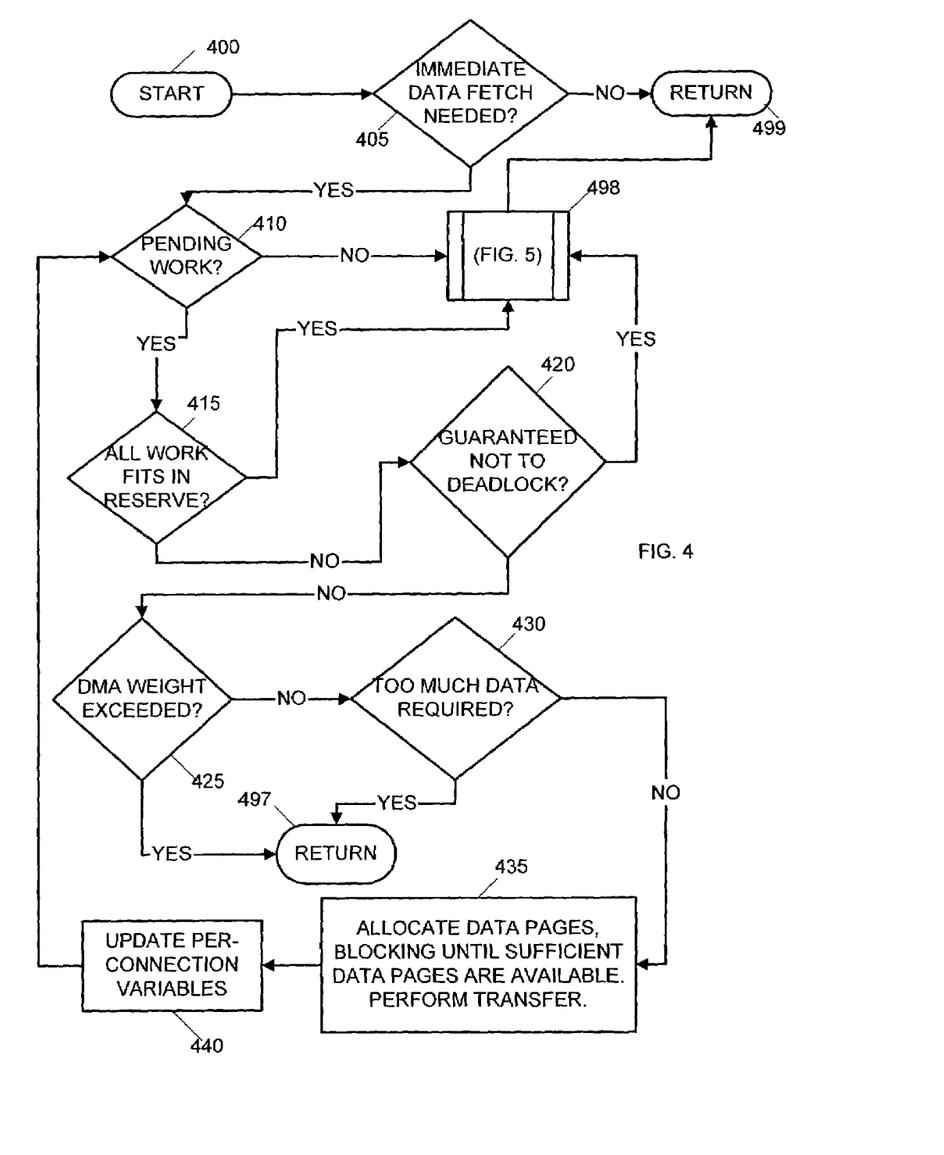
FIG. 4 depicts a flowchart of example processing for an immediate data fetch, according to an embodiment of the invention.

FIG. 4 depicts a flowchart of example processing for an immediate data fetch, according to an embodiment of the invention. Control begins at block 400. Control then continues to block 405 where the data fetch engine 145 determines whether an immediate data fetch operation is needed. In an embodiment, the data fetch engine 145 makes the determination by checking the immediate data fetch needed variable. If the determination at block 405 is false, then control continues to block 499 where the function returns.

If the determination at block 405 is true, then control continues to block 410 where the data fetch engine 145 determines whether any pending work exists for the connection indicated in the immediate data fetch connection variable. In an embodiment, the data fetch engine 145 makes the determination by checking whether the total data not allocated variable is not equal to zero. The total data not allocated variable is the number of data pages not already allocated required by this connection to complete all commands that have already been fetched.

Figure 5:
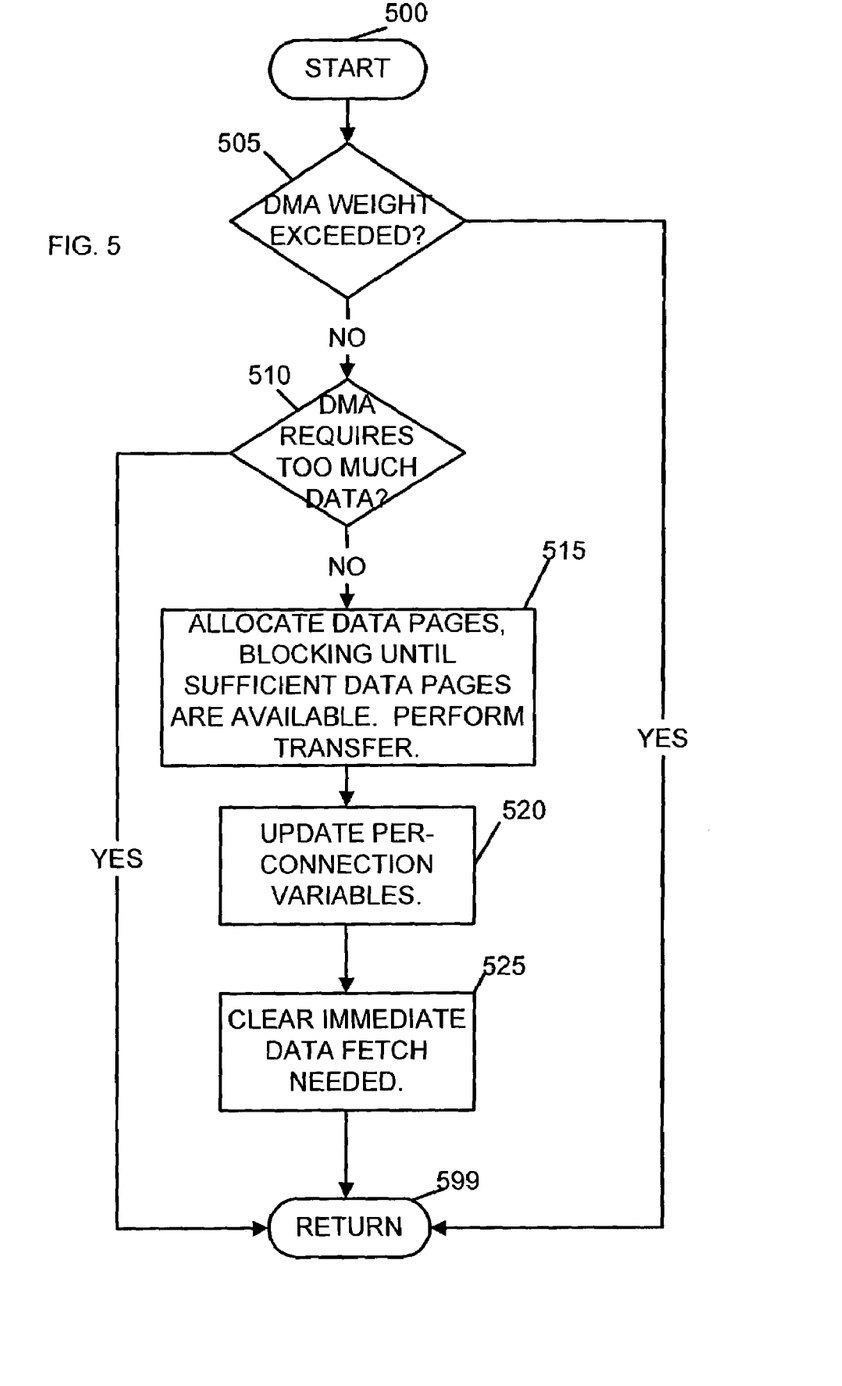
FIG. 5 depicts a flowchart of further example processing for an immediate data fetch, according to an embodiment of the invention.

If the determination at block 410 is false (no pending work), then control continues to block 498 where the processing of FIG. 5 is invoked, as further described below. Control then continues to block 499 where the function returns.

If the determination at block 410 is true (pending work exists), then control continues to block 415 where the data fetch engine 145 determines whether all work fits in a reserve area. The reserve area contains data pages reserved for the current connection, which may not be used by other connections. In an embodiment, the data fetch engine 145 makes the determination by checking whether (data in this request)+(total data allocated)+(total data not allocated)<= (reserve data allocation). The total data allocated is the number of data pages currently in use by this connection. The total data not allocated is the number of data pages not already allocated required by this connection to complete all commands that have been already fetched. The reserve data allocation is the number of data pages that are reserved for the sole use of this connection and cannot be used by any other connection. The reserve data allocation may be used to guarantee a certain amount of resources available for a given connection. For example, the reserve data allocation may be used to prevent the command fetch engine 140 from blocking for a lengthy period of time if data pages are frequently all in use by other connections.

If the determination at block 415 is true, then control continues to block 498 as previously described above.

If the determination at block 415 is false, then control continues to block 420 where the data fetch engine 145 determines whether a deadlock is guaranteed not to occur if an out-of-order transfer occurs. In an embodiment, the data fetch engine 145 makes the determination by checking whether (in order data allocation)>=(total data not allocated). The in order data allocation variable stores the number of data pages allocated by this connection for command blocks that have no intervening command blocks that have yet had data fetched. In another embodiment, the in order data allocation variable stores the number of data pages that are guaranteed to be freed by this connection without requiring additional data page allocations. In another embodiment, the data fetch engine 145 makes the determination by comparing (in order data allocation)>= (longest contiguous out-of-order sequence).

If the determination at block 420 is true, then control continues to block 498 as previously described above.

If the determination at block 420 is false, then control continues to block 425 where the data fetch engine 145 determines whether the DMA weight has been exceeded. In an embodiment the data fetch engine 145 does the determination by checking whether (in order request size)>(remaining DMA weight). The remaining DMA weight variable indicates the number of data pages remaining for this connection for this round-robin traversal. The value of the remaining DMA weight variable is initialized to the total DMA weight and is decremented upon each DMA. It is also decremented for each immediate data fetch transfer, which prevents the out-of-order transfers from starving other traffic. The total DMA weight is the total number of data pages that can be transferred for this connection during a single round-robin traversal of all connections by the data fetch engine 145. The total DMA weight is used to prevent a single connection from monopolizing all DMA time and starving other connections.

If the determination at block 425 is true, then control continues to block 497 where the function returns.

If the determination at block 425 is false, then control continues to block 430 where the data fetch engine 145 determines whether the DMA will require too much data for this connection. In an embodiment, the data fetch engine 145 makes the determination by checking whether (total data allocated)+(in order request size)>(maximum data allocation). The maximum data allocation indicates the maximum number of data pages that the current connection can have allocated at any given time. The maximum data allocation may be used to prevent a single connection from monopolizing too many resources if resources are over-committed, meaning the sum of the maximum data allocation values exceeds the total amount of data pages available.

If the determination at block 430 is true, the control continues to block 497 where the function returns.

If the determination at block 430 is false, then control continues to block 435 where the data fetch engine 145 allocates the data pages in the storage device 135, blocking the data transfer until sufficient data pages are available, and performs the data transfer between the initiator 102 and the I/O adapter 104. The data transfer between the I/O adapter 104 and the network 106 is performed later, after which an explicit command completion notification is sent to the initiator 102 if the earlier implicit notification did not also serve as a command complete notification. Control then continues to block 440 where the data fetch engine 145 updates per-connection variables by increasing the total data allocation by the operation size, decreasing the total data not allocated by the operation size, increasing the in order data allocation by at least the operation size and possibly more because of previous out-or-order transfers, and decreasing the remaining DMA weight by the operation size.

Control then returns to block 410 where the data fetch engine 145 again attempts to do an immediate data fetch request, as previously described above.

FIG. 5 depicts a flowchart of further example processing for an immediate data fetch, according to an embodiment of the invention. Control begins at block 500. Control then continues to block 505 where the data fetch engine 145 determines whether the DMA weight is exceeded. In an embodiment, the data fetch engine 145 makes the determination by checking whether the immediate data fetch request size is greater than the remaining DMA weight. If the determination at block 505 is true, then control continues to block 599 where the function returns.

If the determination at block 505 is false, then control continues to block 510 where the data fetch engine 145 determines whether the DMA will require too much data for this connection. In an embodiment, the data fetch engine 145 makes the determination by checking whether (total data allocated)+(immediate data fetch request size)>(maximum data allocation). If the determination at block 510 is true, then control continues to block 599 where the function returns.

If the determination at block 510 is false, then control continues to block 515 where the data fetch engine 145 allocates the data pages in the storage device 135, blocking the data transfer until sufficient data pages are available, and performs the transfer from the initiator 102 to the I/O adapter 104.

Control then continues to block 520 where the data fetch engine 145 updates the per-connection variables by increasing the total data allocated by the operation size, increasing the in order data allocation by the operation size if the total data not allocated equals zero, and decreasing the remaining DMA weight by the operation size.

Control then continues to block 525 where the data fetch engine 145 clears the immediate data fetch needed variable. Control then continues to block 599 where the function returns.

Figure 6:
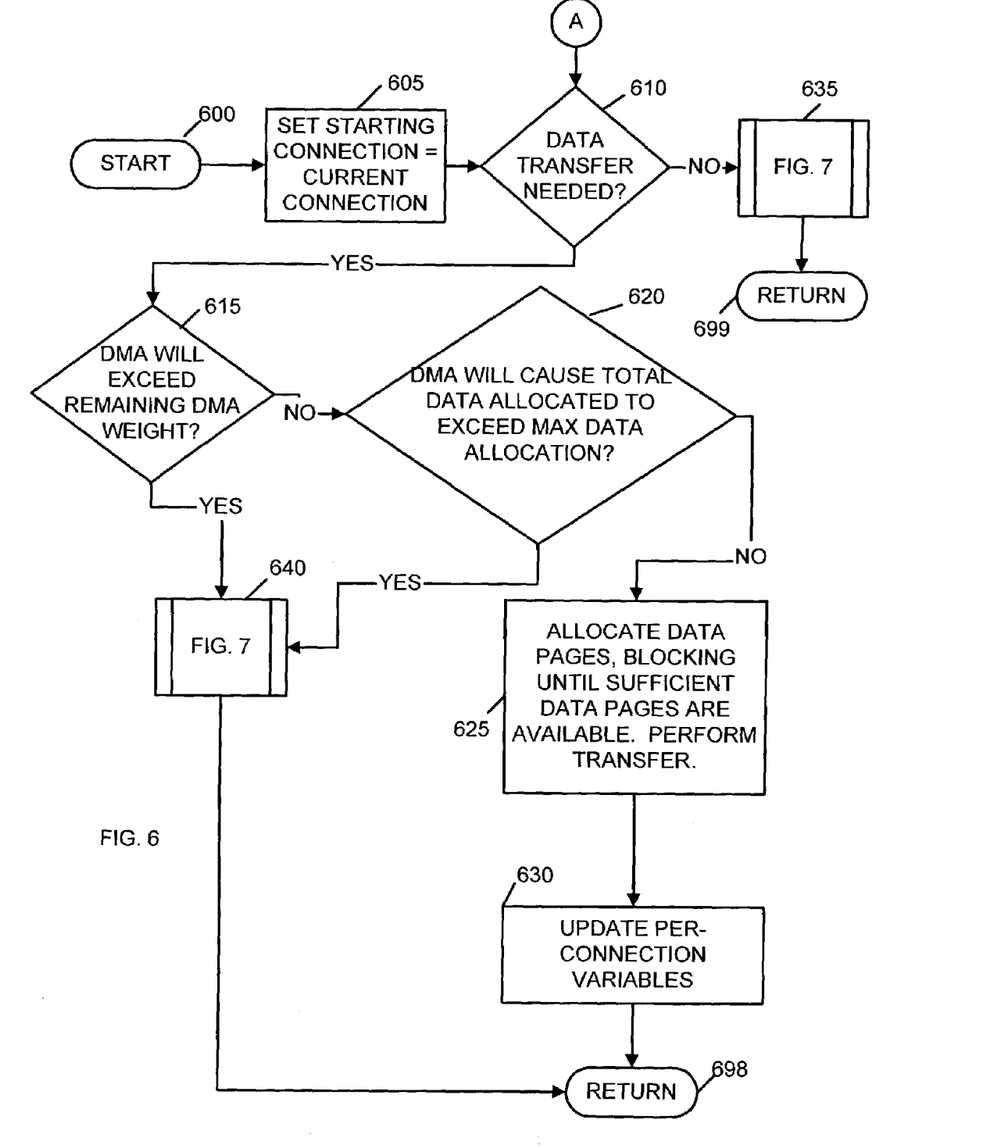
FIG. 6 depicts a flowchart of example processing for a non-immediate data fetch, according to an embodiment of the invention.

FIG. 6 depicts a flowchart of example processing for a non-immediate data fetch, according to an embodiment of the invention. Control begins at block 600. Control then continues to block 605 where the data fetch engine 145 sets the starting connection equal to the current connection. The starting connection is used by the data fetch engine 145 as an endpoint to detect when all connections have been examined during an attempt to do a non-immediate data fetch.

Figure 7:
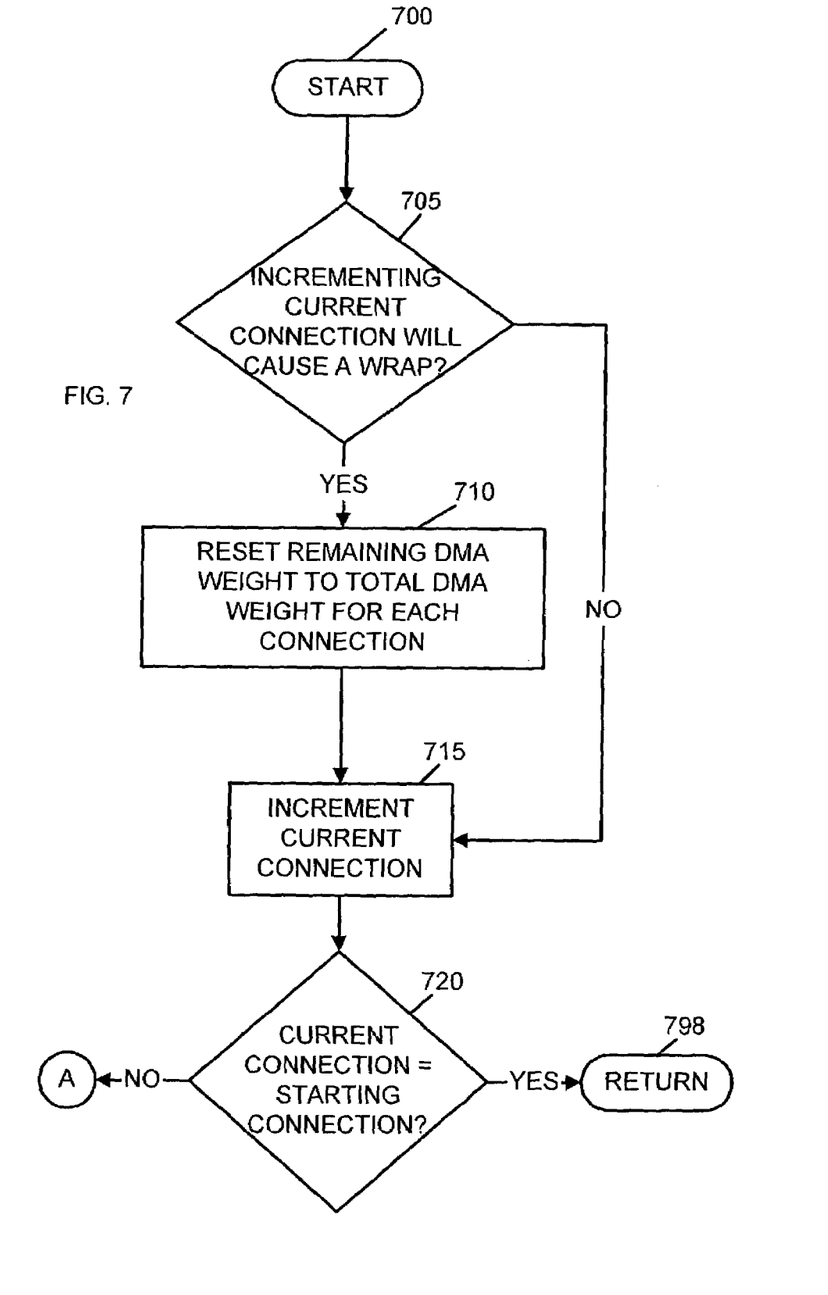
FIG. 7 depicts a flowchart of further example processing for a non-immediate data fetch, according to an embodiment of the invention.

Control then continues to block 610 where the data fetch engine 145 determines whether a data transfer is needed for the current connection. If the determination at block 610 is false, then control continues to block 635 where the processing of FIG. 7 is invoked. Control then continues to block 699 where the function returns.

If the determination at block 610 is true, then control continues to block 615 where the data fetch engine 145 determines whether the DMA will exceed the remaining DMA weight for this connection. If the determination at block 615 is true, then control continues to block 640 where the processing of FIG. 7 is invoked. Control then continues to block 698 where the function returns.

If the determination at block 615 is false, then control continues to block 620 where the data fetch engine 145 determines whether the DMA will cause the total data allocated to exceed the maximum data allocation for this connection. If the determination at block 620 is true, then control continues to block 640 as previously described above.

If the determination at block 620 is false, then control continues to block 625 where the data fetch engine 145 allocates data pages in the storage device 135, blocking until sufficient pages are available, and performs the data transfer between the initiator 102 and the storage device 135 in the I/O adapter 104. The data transfer between the I/O adapter 104 and the network 106 is performed later, after which an explicit command completion notification is sent to the initiator 102 if the earlier implicit notification did not also serve as a command complete notification.

Control then continues to block 630 where the data fetch engine 145 updates per-connection variables by increasing the total data allocated by the operation size, decreasing the total data not allocated by the operation size, increasing the in order data allocation by at least the operation size, and possibly more because of previous out-of-order transfers, and decreasing the remaining DMA weight by the operation size. Control then continues to block 698 where the function returns.

FIG. 7 depicts a flowchart of further example processing for a non-immediate data fetch, according to an embodiment of the invention. Control begins at block 700. Control then continues to block 705 where the data fetch engine 145 determines whether incrementing the current connection will cause a wrap, meaning that all connections have been processed. If the determination at block 705 is true, then control continues to block 710 where the data fetch engine 145 resets the remaining DMA weight to the total DMA weight for each connection. Control then continues to block 715 where the data fetch engine 145 increments the current connection. Control then continues to block 720 where the data fetch engine 145 determines whether the current connection equals the starting connection. If the determination at block 720 is true, then control continues to block 798 where the function returns because pending immediate data fetch requests need to be checked. If the determination at block 720 is false, then control returns to block 610 in FIG. 6.

If the determination at block 705 is false, then control continues directly to block 715 as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   receiving a command at an adapter from an initiator that requests a transfer of data;
   determining whether the command requests an immediate transfer or a non-immediate transfer;
   transferring the data from the initiator to the adapter;
   if the command requests the non-immediate transfer, reporting to the initiator an implicit notification that the command completed before the transferring of the data from the initiator to the adapter; and
   if the command requests the immediate transfer, responding with a notification to the initiator that the command completed successfully after transferring the data to the adapter and prior to the adapter completing a process based on the command.

2. The method of claim 1, further comprising:
   responding with an explicit notification to the initiator that the command completed successfully subsequent to the adapter completing the process based on the command.

3. The method of claim 1, further comprising:
   determining whether the data will fit within a reserved area allocated to a connection associated with the command.

4. The method of claim 1, further comprising:
   allocating at least one page in the adapter to hold the data; and
   blocking the transferring until the allocating is complete.

5. The method of claim 1, further comprising:
   reporting an explicit notification to the initiator that the command completed successfully after transferring the data from the adapter.

6. An apparatus comprising:
   means for receiving at an adapter a plurality of commands on a plurality of connections from an initiator, wherein the plurality of commands requests transfer of respective data, and wherein the plurality of commands have an order of receipt;
   means for determining whether each of the plurality of commands requests an immediate transfer or a non-immediate transfer;
   means for transferring at least some of the data out-of-order from the initiator to the adapter;
   means for reporting an implicit notification to the initiator that the command completed successfully after transferring the data to the adapter and before completing a process based on the command if the command requests the immediate transfer; and
   means for reporting to the initiator the implicit notification that the command completed before the transfer of the data from the initiator to the adapter if the command requests the non-immediate transfer.

7. The apparatus of claim 6, further comprising:
   means for determining which of the data is to be transferred out-of-order.

8. The apparatus of claim 6, further comprising:
   means for transferring all of the data in order from the adapter.

9. The apparatus of claim 8, further comprising:
   means for reporting an explicit notification to the initiator that respective commands completed successfully after transferring the respective data from the adapter.

10. The apparatus of claim 6, further comprising:
    means for allocating at least one page in the adapter to hold the data; and
    means for blocking the means for transferring until the allocating is complete.

11. The apparatus of claim 6, further comprising:
    means for round-robin processing of the plurality of commands in the plurality of connections.

12. A storage medium encoded with instructions, wherein the instructions when executed comprise:
    receiving a command from an initiator that requests a transfer of data;

transferring the data from the initiator to an adapter;

determining whether to perform the transferring out-of-order with an order of a plurality of commands received from the initiator;

determining whether the command requests an immediate transfer or a non-immediate transfer;

reporting an implicit notification to the initiator that the command completed successfully after transferring the data to the adapter and prior to the adapter completing a process based on the command if the command requests the immediate transfer; and reporting to the initiator the implicit notification that the command completed before the transferring of the data to the adapter if the command requests the non-immediate transfer.

13. The storage medium of claim 12, further comprising:

determining whether the data will fit within a reserved area allocated to a connection associated with the command.

14. The storage medium of claim 12, further comprising:

allocating at least one page in the adapter to hold the data; and blocking the transferring until the allocating is complete.

15. The storage medium of claim 12, further comprising:

reporting an explicit notification to the initiator that the command completed successfully after completing the process.

16. The storage medium of claim 12, wherein the implicit notification further comprises:

bumping a tail pointer to a next entry on a queue, wherein the queue stores the command.

17. The storage medium of claim 12, wherein the determining further comprises:

determining whether an out-of-order transfer would cause a deadlock condition.

18. An input/output adapter comprising:

a data fetch engine to transfer data from an initiator to the input/output adapter; and a command fetch engine to:

receive a command from the initiator that requests transfer of the data, determine whether the command requests an immediate transfer or a non-immediate transfer, when the command requests an immediate transfer, report to the initiator an implicit notification that the command completed after the transfer of the data from the initiator to the input/output adapter but prior to the adapter completing a process based on the command, and when the command requests a non-immediate transfer, report to the initiator the implicit notification that the command completed before the transfer of the data from the initiator to the input/output adapter.

19. The input/output adapter of claim 18, further comprising:

a command queue, wherein the command queue receives the command from the initiator, and wherein the command fetch engine is further to report the implicit notification by bumping a tail pointer to a next entry on the command queue.

20. The input/output adapter of claim 18, wherein the data fetch engine is further to go round-robin through a plurality of connections looking for associated commands that have data that needs to be fetched.

21. A system comprising:

an initiator to pin at least one page, send a command that requests transfer of data, and unpin the at least one page after receipt of an implicit notification that the command completed; and an adapter to receive the command, determine whether the command requests an immediate transfer or a non-immediate transfer, report the implicit notification after transfer of the data from the initiator to the adapter but prior to the adapter completing a process based on the command if the command requests the immediate transfer, and report to the initiator the implicit notification that the command completed before the transfer of the data to the adapter if the command requests the non-immediate transfer.

22. The system of claim 21, wherein the implicit notification comprises a bump of a tail pointer to a next entry on a command queue.

23. The system of claim 21, wherein the adapter is further to send an explicit command completion notification to the initiator after completing the process based on the command.

* * * * *